US009432446B2

(12) United States Patent
Kanigicherla et al.

(10) Patent No.: US 9,432,446 B2
(45) Date of Patent: Aug. 30, 2016

(54) SECURE DIGITAL HOST CONTROLLER VIRTUALIZATION

(75) Inventors: Balaji Kanigicherla, Andhra Pradesh (IN); Siva Raghuram Voleti, Andhra Pradesh (IN); Dhanumjai Pasumarthy, Andhra Pradesh (IN)

(73) Assignee: Ineda Systems PVT. LTD, Hyderabad (IN)

(*) Notice: Subject to any disclaimer, the term of this patent is extended or adjusted under 35 U.S.C. 154(b) by 292 days.

(21) Appl. No.: 14/112,393

(22) PCT Filed: Apr. 19, 2012

(86) PCT No.: PCT/IN2012/000284
§ 371 (c)(1),
(2), (4) Date: Oct. 17, 2013

(87) PCT Pub. No.: WO2012/143949
PCT Pub. Date: Oct. 26, 2012

(65) Prior Publication Data
US 2014/0040382 A1 Feb. 6, 2014

(30) Foreign Application Priority Data
Apr. 19, 2011 (IN) .......................... 1346/CHE/2011

(51) Int. Cl.
*H04L 29/08* (2006.01)
*G06F 13/38* (2006.01)
(Continued)

(52) U.S. Cl.
CPC .............. *H04L 67/10* (2013.01); *G06F 13/38* (2013.01); *G06F 13/385* (2013.01);
(Continued)

(58) Field of Classification Search
CPC .......... G06F 13/385; G06F 1/24; G06F 3/00; G06F 13/00; G06F 13/38; G06F 13/387; H04L 29/08; H04L 67/10; G06K 19/07741; G06K 7/0043; G06K 7/0052; G06K 7/0073; H05K 5/0282
See application file for complete search history.

(56) References Cited

U.S. PATENT DOCUMENTS 7,996,631 B1 * 8/2011 Bender ................. G06F 3/0617
709/203
8,412,860 B2 * 4/2013 Kishore .............. G06F 13/4022
710/64

(Continued)

FOREIGN PATENT DOCUMENTS

| CN | 101534299 | 9/2009 |
| CN | 1773474 | 11/2010 |
| WO | 2008030350 | 3/2008 |

OTHER PUBLICATIONS

Written Opinion of the International Search Report, PCT/IN2012/000284, China International Search Authority, Completed Oct. 10, 2012, Mailed Oct. 18, 2012.

(Continued)

*Primary Examiner* — Chirag R Patel
(74) *Attorney, Agent, or Firm* — Workman Nydegger (57) ABSTRACT

Described herein are methods and system for virtualization of the secure digital (SD) host controller to enable sharing a SD device among various multiple host processors in a multi-processor computing system. In one implementation the method of sharing a SD device amongst a plurality of hosts of a multi-host computing system comprises detecting the SD device on occurrence of a reset event, receiving an enumeration request, from at least a first host and a second host of the plurality of hosts, to enumerate the SD device with respect to the second host, enumerating the SD device with respect to the second host, and initiating data exchange between the SD device and each of the plurality of hosts.

8 Claims, 5 Drawing Sheets

(51) Int. Cl.
    *G06K 7/00*           (2006.01)
    *G06K 19/077*      (2006.01)

(52) U.S. Cl.
    CPC ......... *G06F 13/387* (2013.01); *G06K 7/0043* (2013.01); *G06K 7/0052* (2013.01); *G06K 7/0073* (2013.01); *G06K 19/07741* (2013.01)

(56) References Cited

U.S. PATENT DOCUMENTS

| | | | | |
|---|---|---|---|---|
| 8,589,643 | B2* | 11/2013 | Meyer | G06F 13/1605 711/100 |
| 8,745,238 | B2* | 6/2014 | Matthews | G06F 13/4081 709/226 |
| 2005/0036397 | A1* | 2/2005 | Yeh | G06F 3/061 365/232 |
| 2007/0192518 | A1* | 8/2007 | Rupanagunta | G06F 13/124 710/62 |
| 2009/0282187 | A1* | 11/2009 | Ito | G06F 12/0866 711/103 |
| 2010/0011128 | A1 | 1/2010 | Paycher et al. | |
| 2010/0153591 | A1 | 6/2010 | Cho | |

OTHER PUBLICATIONS

International Search Report, PCT/IN2012/000284, China International Search Authority, Completed Sep. 30, 2012, Mailed Oct. 18, 2012.

* cited by examiner

SECURE DIGITAL HOST CONTROLLER VIRTUALIZATION

CROSS-REFERENCE TO RELATED APPLICATIONS

This application claims priority to and the benefit of PCT Application Serial No. PCT/IN2012/000284, filed on Apr. 19, 2012, entitled "SECURE DIGITAL HOST CONTROLLER VIRTUALIZATION", which also claims priority to and the benefit of Indian Patent Application No. 1346/CHE/2011, entitled "SECURE DIGITAL HOST CONTROLLER VIRTUALIZATION", filed on Apr. 19, 2011, which are incorporated herein in their entirety.

TECHNICAL FIELD

The present subject matter, in general, relates to multi-host computing systems and in particular to secure digital host controllers for multi-host computing systems.

BACKGROUND

Computing systems, such as laptops, netbooks, workstations, and desktop computers typically include a central processing unit (CPU), also known as a host processor, running an operating system for carrying out various functionalities of the computing system. The host processor generally includes a class of software modules, known as drivers, which interact with and control various peripheral devices connected to the computing systems for providing the functionalities. The peripheral devices include, for instance, mass storage devices for reading and writing data, media devices like audio players for providing output of audio files playing in the computing system, and network interfaces for connecting to a network environment. One example of a mass storage device may be a Secure Digital (SD) memory card. In another example, a network interface for connecting to the network environment may be a SD input-output (I/O) card, such as a Bluetooth® SD I/O card.

The system drivers generally interact with the peripheral devices through hardware interfaces, known as host controllers provided in the computing systems for controlling the peripheral devices. For example, a computing system may include SD host controller for controlling a SD memory card connected to the computing system.

With the advent of technology, computing systems with multiple processors supporting different operating systems have come into existence. In order to reduce system costs and power consumption, and often times to maintain compactness of the computing systems, the host processors are configured to share the same peripheral devices.

SUMMARY

This summary is provided to introduce concepts related to virtualization of a Secure Digital (SD) host controller unit to allow sharing of SD devices by more than one host processors in a computing device having multi-host processor, which are further described in the detailed description. This summary is not intended to identify essential features of the present subject matter nor is it intended for use in determining or limiting the scope of the present subject matter.

In one implementation, the method of sharing a SD device amongst a plurality of hosts of a multi-host computing system comprises detecting the SD device on occurrence of a reset event, receiving an enumeration request, from at least a first host and a second host of the plurality of hosts, to enumerate the SD device with respect to the second host, enumerating the SD device with respect to the second host, and initiating data exchange between the SD device and each of the plurality of hosts.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. For simplicity and clarity of illustration, elements in the figures are not necessarily to scale.

DETAILED DESCRIPTION

The present subject matter describes methods and systems for sharing of Secure Digital (SD) devices by multiple host processors in a multi-host computing system. Such methods and systems may be implemented in various multi-host computing systems, examples of which include, but are not restricted to, computing devices, such as mainframe computers, workstations, personal computers, desktop computers, minicomputers, servers, multiprocessor systems, and laptops; cellular communicating devices, such as personal digital assistants, smart phones, and mobile phones.

Conventional computing systems include a single host processor. In such a computing system, peripheral devices, such as a SD card interface, are configured to interface with only one host processor, while, at the same time, the host processor is configured to control and communicate with a dedicated SD card interface.

Recent times have witnessed a rapid convergence between consumer electronic devices and personal computer (PC) class devices. Many devices, for example, smart phones that are compact and yet possess computing capabilities like a PC, combine the features of consumer electronic devices and PC class devices and have a huge demand in the market.

The consumer electronic devices and PC class devices are characterized by their own distinctive classes of hardware, operating systems and user interfaces. For example, cell phones typically incorporate low-power processors that consume less resources such as memory, processing power and battery power, while a PC class device such as, a laptop may provide better performance or support more applications, however, consume more power. To enable convergence of the consumer electronic devices with the PC class devices, multi-host computing systems are implemented.

For example, the multi-host computing systems, like a handheld device, may comprise two host processors, host 1 and host 2, where each host processor supports a respective operating system to perform different functions on the same hardware platform. Each operating system may provide a particular advantage over the other operating system in the computing system. For example, host 1 and host 2 may run two different operating systems, OS 1 and OS 2, where the OS 1 may provide better performance or support more applications than OS 2, however, the OS 2 may consume less resources such as memory, processing power, battery power compared to OS 1. In such a scenario, the multi-host computing system may run OS 1 for application processing and computational purposes when the multi-host computing system is running on a power supply, whereas may run OS 2 when the handheld device is operated on battery power.

Thus, the multi-host computing systems allow more than one host processor to operate on the same hardware platform, concurrently. Such concurrent operation of heterogeneous host processors with their respective operating systems within the same hardware platform may require many peripheral devices, such as SD card interfaces to be duplicated, resulting in a very high bill of material (BOM) cost for the multi-host computing systems. In order to reduce costs, as well as to maintain compactness of the multi-host computing systems, re-use or sharing of the peripheral devices, such as SD card interfaces between the host processors, is required.

However, re-use or sharing of a SD card interface may be difficult since conventionally available host processors are configured to work with a dedicated SD host controller and conventional SD card interfaces are configured to interact with a single host processor and are incapable of interacting with more than one host processors.

As known conventionally, different types of SD devices, each providing different features/functionalities exist. One typical use of a SD device is that of a memory card. SD memory cards, such as Micro SD cards, High Capacity (HC) SD cards, Extended Capacity (XC) SD cards are commonly know. Examples of other conventionally available SD devices are SDI/O cards or SD combo cards such as Wi-Fi cards, Personal handy Phone System (PHS) cards, Global Positioning System (GPS) cards, 3G cards and Bluetooth® cards. A SDI/O card provides a specific I/O functionality while its interface with the host processor to which the functionality is attributed is based on the SD standard. For example, a Wi-Fi Card, also referred to as a Wi-Fi SDI/O card, enables the functionality of a Wi-Fi interface to provide Wi-Fi connectivity and operates in accordance with the SD standard. Similarly, a Bluetooth® SDI/O card may be understood as a device that combines SD format with an I/O device which, in this example, is a Bluetooth® modem.

Though both SD memory cards and SDI/O cards follow the same interface standard, they support different programming structures. The following are the list of similarities and differences between the two types of SD card:
1. Both SD memory cards as well as SDI/O cards support the same set of interface signals:
   a. SDIO card supports interrupt and optional read-wait signaling on the DAT[1] and DAT[2].
2. Both SD memory cards and SDI/O cards support fixed card register set.
3. SD memory and SDI/O cards support different command sets:
   a. For example, CMD52 for SDI/O cards is equivalent to CMD0 for SD memory card, i.e. the reset command.
4. SDI/O cards support upto 8 functions in which a function area, namely, card information area—(CIA) is mandatory. The SD memory cards do not have such function areas:
   a. Each of the SDI/O function can be a separate SDI/O device and hence multi-function devices may use multiple function sets;
   b. The commands to a function controller, such as a Wi-Fi module inside a SDI/O card, are sent through the data and command transfers.
5. SD memory cards being storage elements require file system support. SDI/O may not require the file system support.

Figure 1:
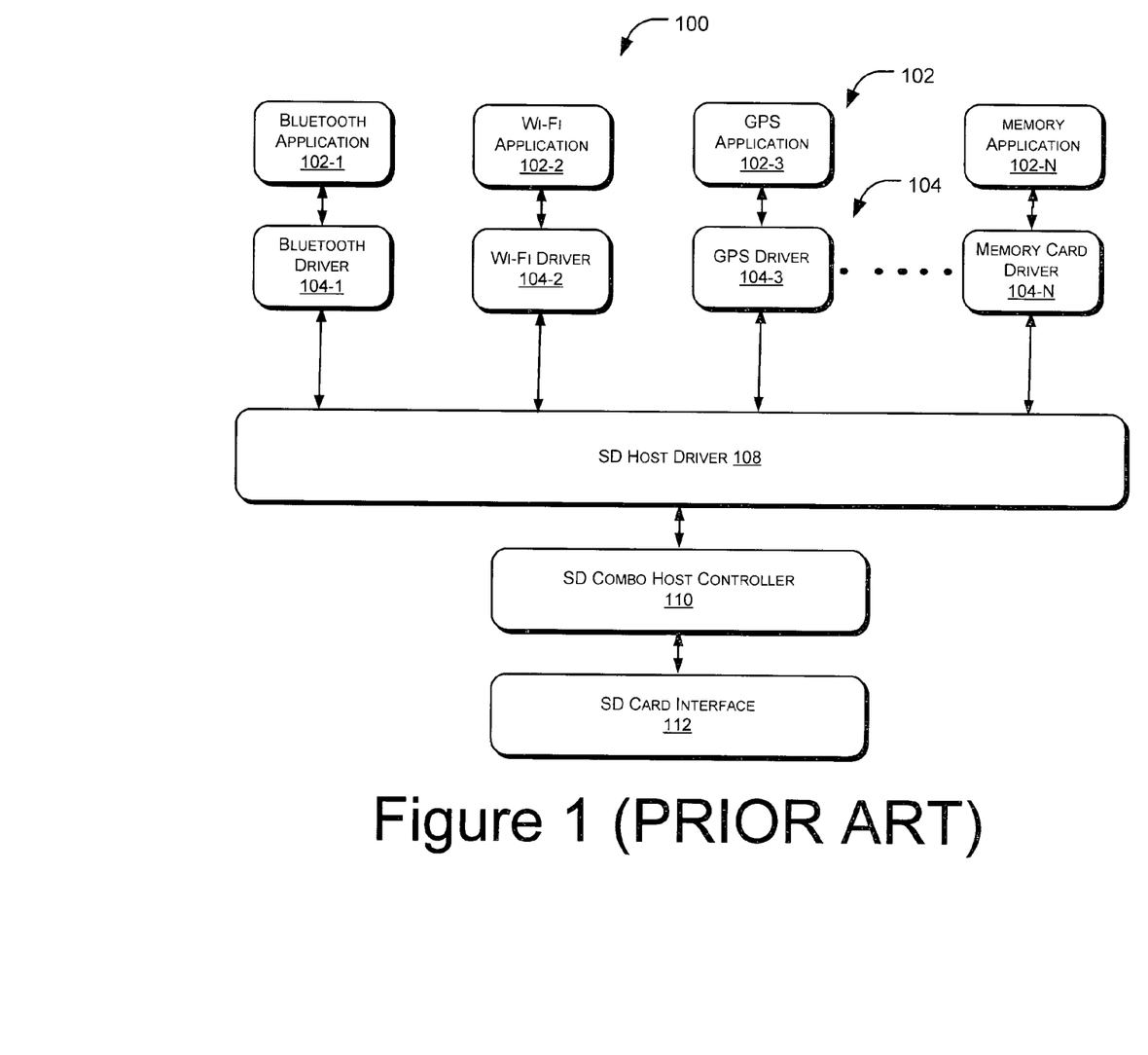
FIG. 1 illustrates a typical secure digital (SD) interface system in a computing system.

FIG. 1 illustrates a typical SD interface system 100. The description of the communication of a SD device (not shown in Figure) with the computing system is explained with reference to FIG. 1. Details conventionally known in the art have been omitted to maintain brevity.

As discussed above, the SD device may be of various types and based on the type of SD device, a corresponding card driver is needed which is used to utilize the functional features provided by the corresponding SD device. According to the embodiment depicted in FIG. 1, for a Bluetooth® SDI/O card (not shown in Figure) enabling a Bluetooth® application 102-1, a Bluetooth® driver 104-1 may be installed with the operating system of the host processor. Likewise, depending on the functionality of connected SD devices corresponding applications 102 and drivers 104 are installed with the operating system of the host processor. Depicted in FIG. 1, as examples and not limitations, are Wi-Fi application 102-2, GPS application 102-3 and memory card application 102-n and their corresponding drivers 104: Wi-Fi card driver 104-2, GPS card driver 104-3 and memory card driver 104-n, respectively.

The various drivers 104 are communicatively coupled to a SD host driver 108 using a driver interface specified by the operating system of the computing system. The SD host driver 108 is in turn used to program a SD host controller 110 through a register interface (not shown in Figure) which is standardized by the SDHC specification prescribed by the SD standard. For example, to enable communication between the Bluetooth® application 102-1 and the Bluetooth® SDI/O card, the Bluetooth® driver 104-1 generates the relevant commands and transfers the same to the SD host driver 108, where SD host driver 108 is responsible of translating the command in a SD standard specified format. The SD host controller 110 interfaces with a SD card interface 112 which is generally an electrical interface, such as a card connector to which the SD device is plugged in. Thus, the SD card interface 112 corresponds with the SD host controller 110 which provides standard interface between the operating systems of the host processor and the SD device to interface the SD device with the computing system.

Further, since in a conventional system, the SD host controller 110 interfaces a single host processor with a SD device that is dedicated to the single host processor, the SD host controller 110 is configured accordingly.

Figure 2:
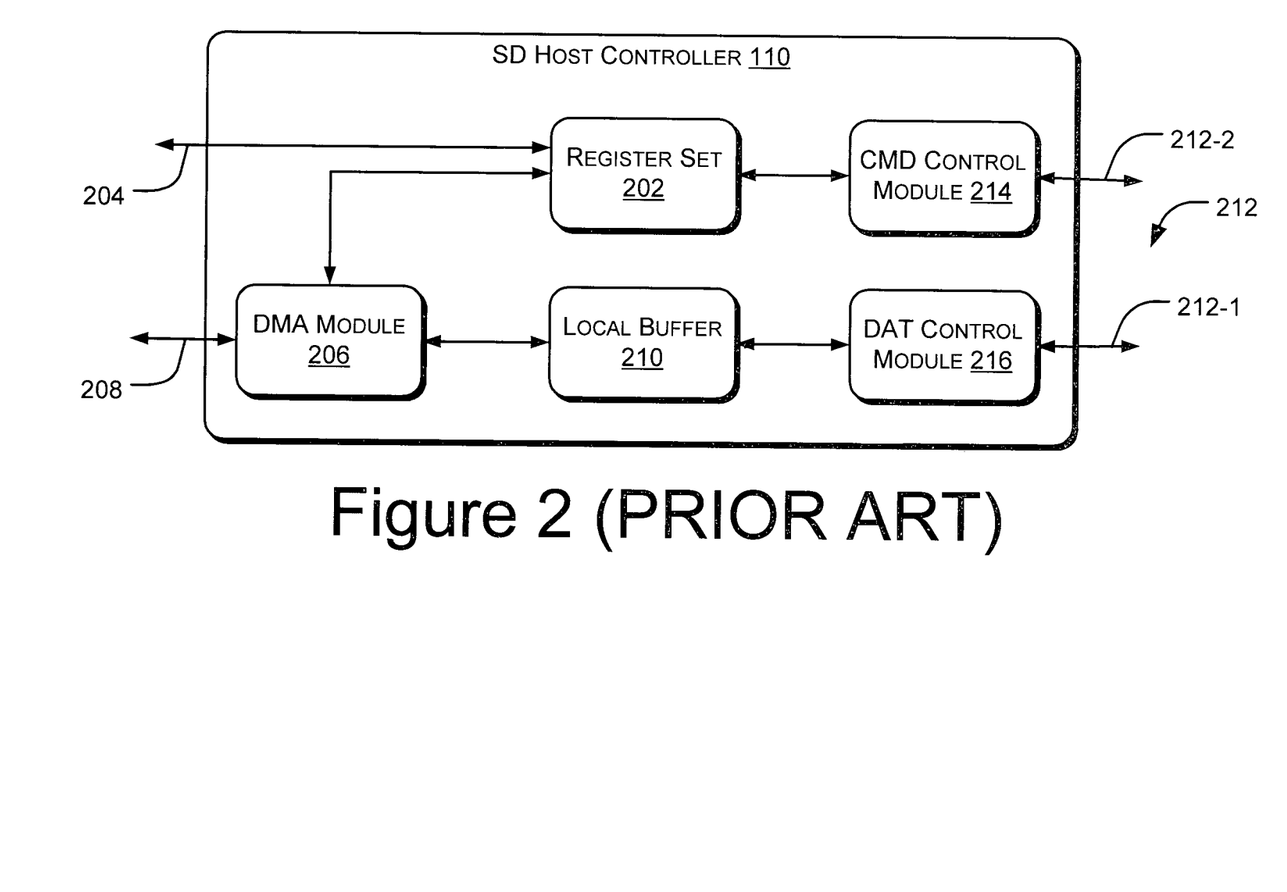
FIG. 2 illustrates a typical SD host controller.

FIG. 2 illustrates the SD host controller 110 which is a conventional SD host controller configured to interface a SD device with a single host controller. To understand the operation of the SD host controller 110, an example may be considered. For instance, consider that the host processor (not shown in Figure) needs to write some data onto a connected SD memory card. For the purpose, the host processor accesses the register set 202 of the SD host controller 110. To access the register set 202, the SD host controller 110 supports a register interface 204 that communicatively couples the register set 202 and the host processor. The register set 202 is defined in accordance with the SDHC standard, typically employed by SDHC compliant controllers, such as the SD host controller 110. In one example, if the host processor operates based on the standard, such as Peripheral Component Interconnect (PCI) or Peripheral Component Interconnect Express (PCIe) standard, the register interface 204 and the register set 202 may be configured accordingly. The SD host controller 110 places the relevant command, indicative of the location of the data to be transferred to the SD memory card, in the register set 202.

Further, the SD host controller 110 includes an inbuilt direct memory access (DMA) module 206, such as an Advanced DMA (ADMA) that is configured to fetch data from the memory of the host processor based on the command placed in the register set 202 by the host processor. In one embodiment, the DMA module 206 also provides the capability of interrupt generation for a predefined number of block transfers. The DMA module 206 uses a system bus interface 208 for the purposes of fetching the data from the memory of the host processor. The data to be written onto the SD memory card, once fetched from the memory of the host processor, is placed in the local memory of the SD host controller 110. The local memory of the SD host controller 110 is hereinafter referred to as local buffer 210. The data from the local buffer 210 is sent to the SD memory card via the SD card interface 112 by generating relevant commands followed by data write transaction enabled through a SD bus interface 212.

A SD bus interface 212 comprising a CMD bus 212-1 and a DAT bus 212-2 that carry, along with the data to be transferred, protocol related signals such as CMD, DAT [3:0], SDCK, power and ground signals is provided in the SD host controller 110. The protocol related signals are generated by CMD control DAT control modules 214 and 216, respectively, implemented by the SD host controller 110 to handle all the SD protocol related requirements. Details conventionally known in the art have been omitted for sake of brevity.

The above mentioned example explains, in brief, the mechanism of transferring data from the host processor to the SD memory card. However, it will be apparent to one skilled in the art, that data transfer from a SD memory card or communication between SDI/O cards and the host processor may be carried out in a conventional computing system in a similar manner.

In accordance with the forgoing explanation, the SD host controller 110 works with a single host processor and operates on predefined protocols to interface a SD device to the host processor. The SD host controller 110 is incapable of interfacing with more than one host processors to allow them to use the SD device simultaneously. In order to allow multiple host processors to simultaneously access the SD device, the SD host controller 110 needs to virtualize the multiple host processors to the SD card interface 112 in such a way that from the perspective of each of the host processors, it appears as if the SD card interface 112 is dedicated to the host processor, while simultaneously from a perspective of the SD device, it should appear to the SD device that all transfers are being initiated by the single host processor. For these purposes, the virtualization techniques may be implemented.

In general, the virtualization techniques, such as I/O virtualization is a methodology, which transforms accesses between standard I/O devices and the host processors such that the I/O devices can be shared across multiple system images or host processors in a way which hides the sharing from both the host processor and the shared I/O devices. In computing systems supporting I/O virtualization, address remapping is generally used to enable assignment of the I/O devices to the host processors. However, these conventional virtualization techniques only allow the SD card interface to be shared among multiple operating systems running on single host in form of virtual machines.

According to one embodiment of the present subject matter, systems and methods for simultaneous sharing of a SD card interface to allow sharing of a SD device by multiple host processors in a multi-host computing system are described. The multi-host computing system comprises more than one host processors, where each host processor supports an operating system, to perform different functions on the same hardware platform.

In one embodiment, the system and method for sharing of the SD card interface by multiple host processors is enabled by a SD host controller (SDHC) virtualization unit. Conventional SD host controllers are not multi-host aware, or in other words, native SD host controllers are not configured to deal with more than one host processor. Accordingly, the SDHC virtualization unit ensures that these SD host controllers are imparted with the capability to interact with the multiple host processors. To reiterate, the SDHC virtualization unit is needed in multi-host computing systems since the conventionally available host processors are configured to work with dedicated SD host controllers and similarly conventional SD host controllers are configured to interact with a single host processor.

In one implementation, the SDHC virtualization unit may be a standalone unit or independent unit associated with a SD host controller while in another embodiment the SDHC virtualization unit may be implemented as a logical/function module within the SD host controller. While the latter embodiment may be preferred for more compact computing devices, the former embodiment may be useful in adopting legacy or native SD host controllers to the multi-host processor environment. It will be appreciated that in the two aforementioned embodiments, as well as those that will be explained later, the SD virtualization unit may have a hardware implementation, a software implementation Or a combination thereof.

According to one embodiment of the present subject matter, the SDHC virtualization unit allows simultaneous access to a SD card interface to multiple host processors of a multi-host computing system without bringing about any change in the pre-existing configuration of the host processors or the SD host controller. The SDHC virtualization unit appears as the host controller when viewed from a host processor's side, whereas it emulates a host processor to the SD host controller. Thus, the SDHC virtualization unit communicatively couples a conventional host processor, configured to work with a dedicated SDHC host controller, and a conventional SDHC host controller, which is capable of being controlled by a single host processor, in such a manner that the SD device may be shared by the multiple host processors in the multi-host computing system.

The systems and methods can be implemented in a variety of multi-host computing systems. The multi-host computing system may include, but are not limited to, desktop computers, handheld devices, laptops or other portable computers, mobile phones, personal digital assistants (PDA's), tablet PCs, netbooks, workstations, etc., which implement multiple processors on the same hardware platform. In one implementation, the methods and systems for sharing of the SD card interface can be implemented for multi-host computing systems running any operating system such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art.

The methods and systems for sharing of the SD devices in the multi-host computing systems are hereinafter explained in a detailed manner with reference to FIGS. 3 to 5. While aspects of the described systems and methods can be implemented in any number of different computing systems, environments, and/or configurations, the embodiments are described in the context of the above exemplary system architecture(s). For the ease of understanding, the explanation herein is in context of a multi-host computing system having two host processors. However, it will be appreciated by one skilled in the art, that although the methods and systems have been described with respect to two host processors, the concept explained in context thereto may be extend to any number of host processors.

Figure 3:
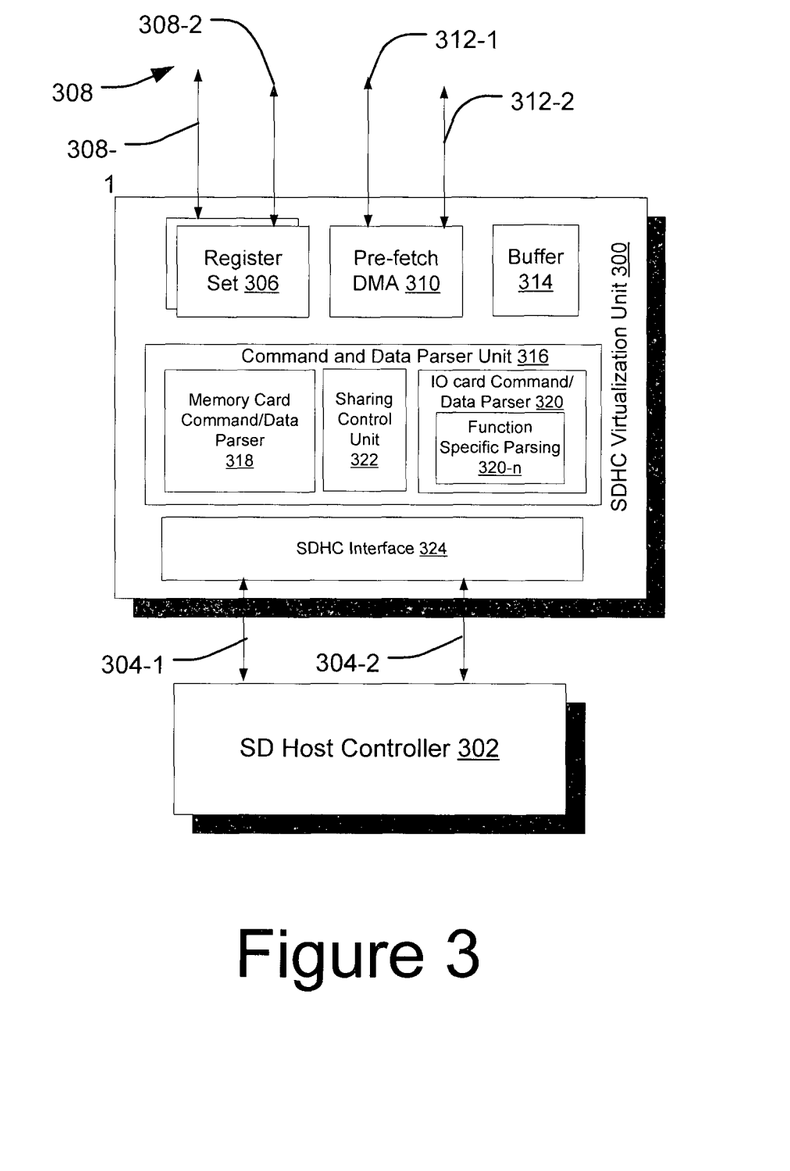
FIG. 3 illustrates an exemplary SD host controller (SDHC) virtualization unit, in accordance with an embodiment of the present subject matter.

FIG. 3 illustrates an exemplary SDHC virtualization unit 300, in accordance with an embodiment of the present subject matter. In one embodiment, the SDHC virtualization unit 300 is implemented in a multi-host computing system (not shown in figure). For example, the multi-host computing system may include two host processors, host 1 and host 2 (not shown in figure), where each host processor supports an operation system, to perform different functions on the same hardware platform.

The SDHC virtualization unit 300 interfaces the host 1 and host 2 to a SD host controller 302 of the computing system. For this purpose, register and data interfaces (not shown in figure) are provided between the host 1 and host 2, respectively, and SDHC virtualization unit 300. Similarly, register and system bus interfaces 304-1 and 304-2 are also provided between the SDHC virtualization unit 300 and the SD host controller 302. In one embodiment, the SD host controller 302 may be a conventional SD host controller, such as SD host controller 110, as explained in context of FIG. 1 and FIG. 2 and the SDHC virtualization unit 300 may be an external module interfaced with the SD host controller 302. However, in another embodiment, the SD host controller 302 may be configured such that the SDHC virtualization unit 300 is integrated therein.

The SDHC virtualization unit 300 includes register sets 306. The register sets 306 are as many in number as the number of host processors in the computing system. Each of the register set 306 includes a host register interface 308 to interface the SDHC virtualization unit 300 with their respective host processor. Depicted in the Figure are host register interfaces 308-1 and 308-2, provided between the host 1 and host 2, respectively, and SDHC virtualization unit 300. It may be noted that since the SDHC virtualization unit 300 is configured to appear as a typical SD host controller to each of the host processors, the configuration of registers in each of the register set 306 is similar to that in a typical SD host controller.

For example, consider a scenario where host 1 and host 2 need to transfer data to a SD device (not shown in Figure) connected to a SD card interface (not shown in Figure) of the computing system. The host 1 and the host 2 accordingly generate appropriate commands and place the same in the register set 306. The commands are indicative of the respective local memories of the host 1 and host 2 where the data to be transferred is placed. The data to be transferred is fetched from the local memories of the host 1 and the host 2 by a pre-fetch direct memory access (PDMA) 310 of the SDHC virtualization unit 300 through host system bus 312-1 and 312-2 that interface the host 1 and the host 2, respectively, to the PDMA 310.

The data in the local memory of the host 1 and the host 2 is fetched and placed in a local memory component, i.e., buffer 314, of the SDHC virtualization unit 300. The buffer 314 is accessed by a command and data parser unit 316, hereinafter referred to as the parsing logic 316, to parse the commands and data packets and transfer the same to the SD card interface.

The parsing logic 316 contains two parsing units, namely memory card command/data parser 318, referred to as MC parser 318 and I/O card command/data parser 320, referred to as IOC parser 320. The MC parser 318 is called upon to enable transfers to and from SD memory cards while the IOC parser 320 is utilized during transfers to and from SDI/O cards. The IOC parser 320 internally contains function specific parsing units 320-n specific to each of the various types of SDI/O cards, such as Wi-Fi cards, Personal handy Phone System (PHS) cards, Global Positioning System (GPS) cards, 3G cards and Bluetooth® cards.

Depending on the SD device connected to the SD card interface, one of the MC parser 318 and IOC parser 320 parses commands from host processors from the register set 306 while the data packets are parsed from the buffer 314. A sharing control unit 322 in the parsing logic 316 is communicatively coupled to the host processors host 1 and host 2 as well as the MC parser 318 and the IOC parser 320 to handle any arbitration required between the host processors host 1 and host 2.

The SDHC virtualization unit 300 further includes a SDHC interface unit 324 to enable programming for the SD host controller 302 taking the requirements from the host 1 and host 2 into account. The SDHC interface unit 324 creates commands for the transfer of the data placed in the buffer 314 and provides it to the SD host controller 302 after arbitrating and interleaving the requests between the host 1 and host 2.

It will be apparent to one skilled in the art that, since the SDHC virtualization unit 300 emulates a host processor to the SD host controller 302, the fetching of data from the local memory of the SDHC virtualization unit 300, i.e. buffer 314, by the SD host controller 302 and transferring the same to the SD device connected SD card interface is accomplished in the conventional manner as described in relation to FIG. 1 and FIG. 2.

Figure 4:
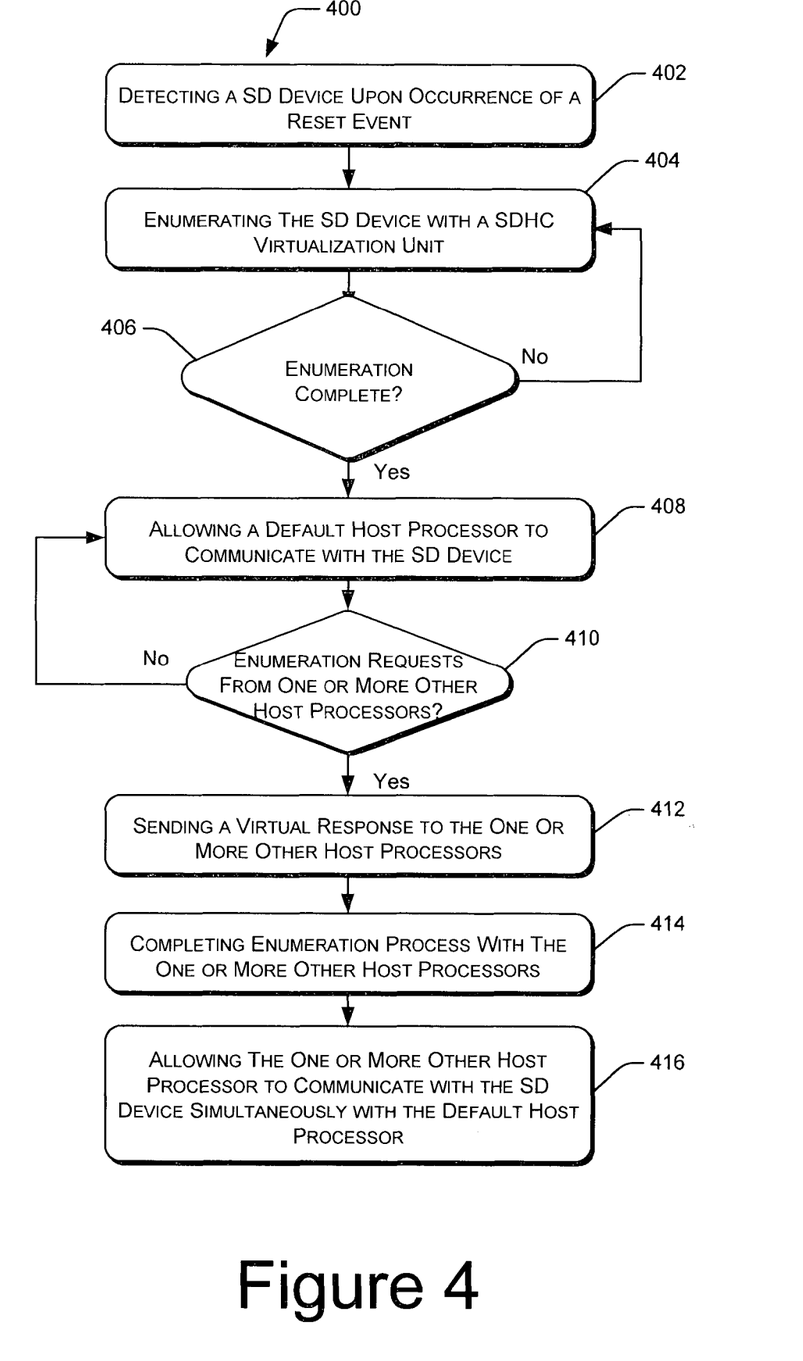
FIG. 4 illustrates an exemplary method of virtualization initialization for SD devices according to one embodiment of the present subject matter.
Figure 5:
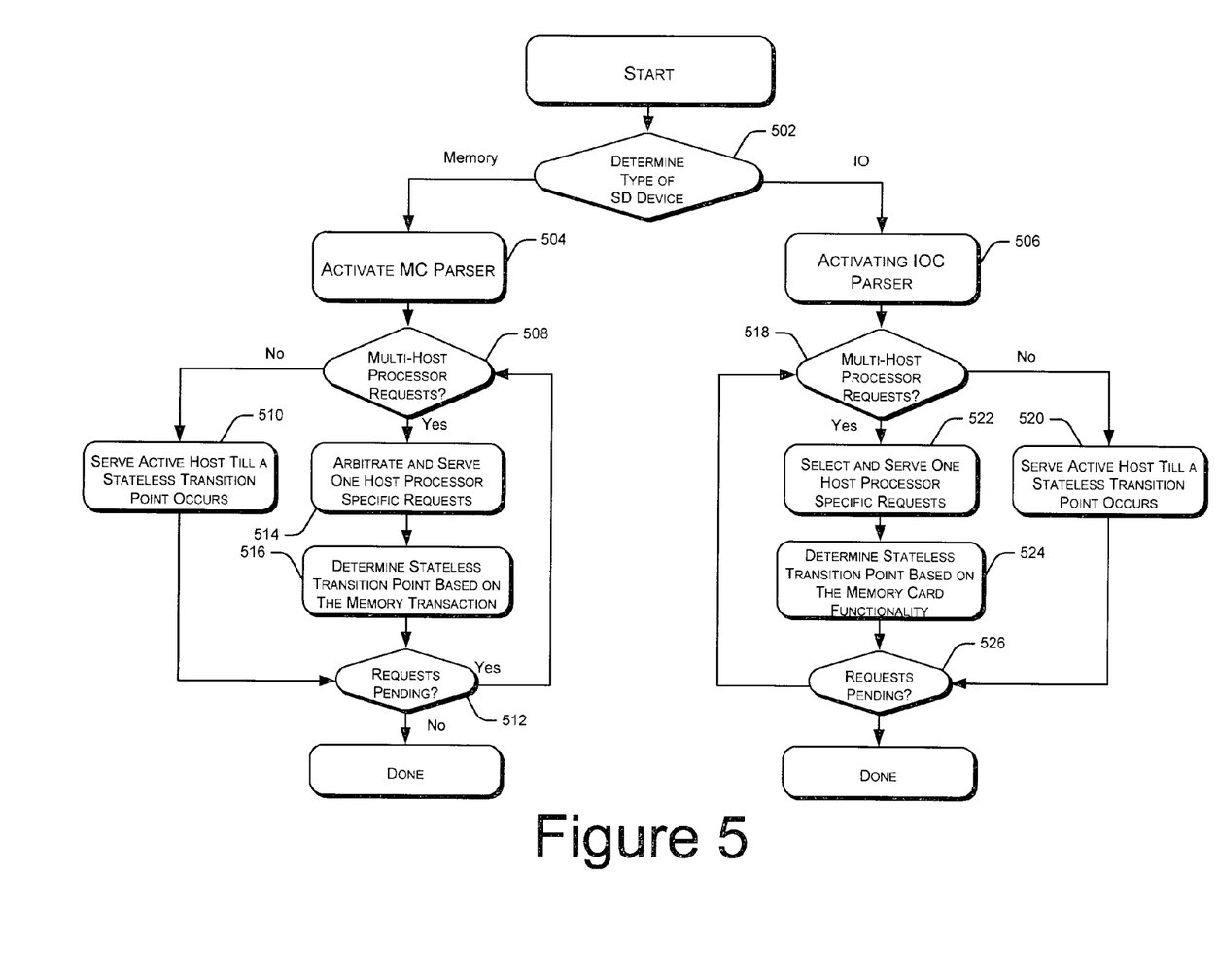
FIG. 5 illustrates an exemplary method of virtualization of SD devices according to one embodiment of the present subject matter.

FIG. 4 illustrates an exemplary method of virtualization initialization 400 for SD devices according to one embodiment of the present subject matter while FIG. 5 illustrates an exemplary virtualization method 500 for sharing of SD devices by multiple host processors in a multi-host computing system, according to one embodiment of the present subject matter.

The methods 400 and 500 may be implemented in a variety of computing systems, however for the ease of understanding, the methods 400 and 500 have been explained to be implemented in the computing system incorporating the aforementioned SDHC virtualization unit 300 for sharing a SD card interface as described in FIG. 3.

The methods 400 and 500, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method.

The order in which the methods 400 and 500 are described is not intended to be construed as a limitation, and any number of the described method blocks can be combined in any order to implement the methods, or an alternative methods. Additionally, individual blocks may be deleted from the methods without departing from the spirit and scope of the subject matter described herein. Furthermore, the methods can be implemented in any suitable hardware, software, firmware, or combination thereof.

The method of virtualization initialization 400 is a method of enumeration of the SD devices connected to a multi-host computing system by the multiple host processors.

Enumeration is a conventionally known process carried out in typical single host processor computing devices as well. By enumerating a SD device a host processor is enabled to obtain all information relevant for the communication with the SD device from the SD devices. The host processor can obtain information, such as what all capabilities are supported by the SD device and the types of SD device. During enumeration the SD host driver sends a sequence of commands to determine the type of the SD device card coupled to the SD card interface. An SDI/O card does not respond to SD memory card related commands and a SD memory card does not respond to SDI/O card related commands. Thus, depending on the response received from the SD device, a SD host driver of the computing device is enabled to determine the type of the SD device. Upon enumeration of the SD device in a conventional computing system the single host processor has ownership of the SD device.

In a multi-host computing system, the case specific to method 400, instead of each of the multiple host processors enumerating the SD device, in one embodiment, the SDHC virtualization unit 300 performs the enumeration. In another embodiment, any one of the multiple host processors may be selects as a default host processor and the enumeration is performed by the default host processor. Details of the enumeration process are explained in details with reference to the method of virtualization initialization 400 illustrated in FIG. 4.

The method of virtualization initialization 400 is initiated at block 402, where, upon occurrence of a reset event, a SD device is detected. For example, events like power on, refresh, insertion of a SD device into the SD card interface may be considered as reset events based on which the SDHC virtualization unit 300 may determine a SD device. At block 404, in one embodiment, the SDHC virtualization unit 300 enumerates the SD device. However, as mentioned above, in another embodiment, the default host processor performs the enumeration. Further, at block 406, if it is determined that the enumeration is complete (YES branch of block 406), the default host processor is allowed to communicate with the SD device at block 408. However, if at block 406 it is determined that the enumeration is ongoing, the method 400 pauses at block 404 (NO branch of block 406), for the enumeration to complete.

The SD device is allowed to be used by the default host processor until, at block 410, enumeration requests from one or more other processors are received. If enumeration requests from one or more other host processors are received (YES branch of block 410), the method 400 proceeds to block 412 where virtual responses are sent to the one or more other host processors, else the default host processor may continue to use the SD device in the manner a single host processor uses a dedicated SD device (NO branch of block 410). Virtual responses are signals generated by the SDHC virtualization unit 300 for the one or more other host processors in response to their enumeration requests. A virtual response is similar to an acknowledgement send by a dedicated SD host controller to the single host controller in a conventional computing system.

At block 414, completion of the enumeration of the SD device with each of the one or more other host processors is determined. At block 416, the other host processors too begin to communicate with the SD device. In one implementation, the SDHC virtualization unit 300 withholds all ongoing communications between the default host processor and the SD device to give preference to the enumeration process over other transfers between the default host processor and the SD device.

An exemplary method of sharing of SD devices by multiple host processors in a multi-host computing system, in according to one embodiment of the present subject matter, is illustrated by virtualization method 500.

The virtualization method 500 begins at block 502 where SDHC virtualization unit 300 determines the types of the SD device connected to the computing system. In one embodiment the type of the SD device may be determined by enumerating the device.

To allow simultaneous access of a SD device to multiple host processors, requests from all the host processors are accepted by the SDHC virtualization unit 300 and the parsing logic 316 arbitrates between the host processors to cater to the requests originating from the multiple host processors. For the purpose, as explained before, the parsing logic 316 includes the MC parser 318 and IOC parser 320 to parse the commands and requests from different host processors. According, based on the type of the SD device, at block 504 the MC parser 318 may be activated if the SD device is a SD memory card. Likewise, at block 506, the IOC parser 320 may be activated if the SD device is a SDI/O card. If SD device is a SDI/O card, the IOC parser 320 in turn activates the relevant function specific parsing unit 320-n based on the functionality of the SDI/O card.

If a SD memory card is connected to the multi-host computing device, at block 508, it is determined whether one host processor or multiple host processors have requested to access the SD memory card. In case only one host processor is active, i.e., only one host processor requests to access the SD memory card (NO branch of block 508), at block 510, the host processor is served. For the purpose, the SDHC virtualization unit 300 instructs the MC parser 318 to parse the command in the register set 306 of the active host processor. The active host processor may be allowed to access the SD memory card and communication between the active host processor and the SD memory card is enabled accordingly. For example, data from the active host processor to the SD memory card may be transferred by the SDHC virtualization unit 300. Upon completion of a command from the active host processor, the method 500 may move to any other pending requests, at block 512. For the purpose, a stateless transition point is awaited. The stateless transition point may be understood as a point at which a command has been accomplished and accordingly upon occurrence of a stateless transition point switching from one command to the other may occur.

However, at block 508, multiple host processors may be active, i.e., more than one host processor may request to access the SD memory card (YES branch of block 508). When multiple host processors request for transfers with the SD memory card, the SDHC virtualization unit 300 selects any one host processor to be served and accordingly instructs the MC parser 318 to parse the commands in the register set 306 of the selected host processor. More specifically, in a situation where multiple host processors are active, the method 500 proceeds to block 514 where an arbitration takes place to selectively serve one of the host processors. The arbitration may be in accordance with a predetermined arbitration logic based on any generally known arbitration mechanism(s) to prioritize any of the multiple host processors. At block 516, a stateless transition point is determined before moving ahead to address other pending requests, at block 512. It may be mentioned, that pending requests may be from the selected host processor that was currently served or a different host processor In one embodiment, in context of arbitrating and switching between multiple host processors, the stateless transition point may be understood as a point at which occurrence of a transition from the one host processor to the other does not corrupt an ongoing communication, such as a data transfer, between an active host processor and the SD memory card. For example, while different host processors are accessing different files from a SD memory card, interleaving of commands by arbitration should not result in corrupting a file opened by one host processor due to accesses from another host processor. Such a situation is avoided when the transition from one host processor to another occurs at a stateless transition point.

While the MC parser 318 parsers the commands and data packets, the sharing control unit 322 programs commands for the SD host controller 302 and prepares data packets in the buffer 314 to be fetched by the SD host controller 302. It will be understood by one skilled in the art that the commands are programmed for a DMA module, such as DMA module 206 of the SD host controller 302, to view data in the buffer 314 as data in local memory of a host controller and fetch it accordingly. Thus, until a stateless transition point occurs while a host processor currently being served, the process of programming commands for the SD host controller 302 and preparation of data packet in the buffer 314 may continue.

In cases where a SDI/O card is connected to the multi-host computing device, at block 518, it is determined whether one host processor or multiple host processors have requested to access the SDI/O card. If a single host processor sends requests, it is served at block 520, whereas, in case multiple host processors send requests arbitration and switching take place at block 522 and 524 in a manner similar to block 514 and 516 to serve the multiple host processors. The method 500 continues until at block 526, it is ascertained that no requests are pending.

In one embodiment, if the SD device is a SD combo card, the MC parser 318 as well as the IOC parser 320 may be activated. The MC parser 318 and the IOC parser 320 may be operated in parallel and the sharing control unit 322 may be configured to co-ordination between the MC parser 318 and the IOC parser 320 to allow the multiple host processors to access the SD combo card.

In one implementation, the SDHC virtualization unit 300 is configured to handle power state change requests from the host processors. Further, the SDHC virtualization unit 300 may also handle interrupt routing and status updating through register sets 306. Also, the SDHC virtualization unit 300 may be responsible for masking actions from a host processor which affects the other host processors, for example, if one host processor tries to eject the SD device while the other host processors are still accessing the SD device, the SDHC virtualization unit 300 can emulate a virtual removal for that particular host processor, while in reality the SD device may still be in use from the other host processors.

Although implementations of a SDHC virtualization unit and a virtualization method have been described in language specific to structural features and/or methods, it is to be understood that the invention is not necessarily limited to the specific features or methods described. Rather, the specific features and methods are disclosed as exemplary implementations for the SDHC virtualization unit and virtualization.

We claim:

1. A method of sharing a secure digital (SD) device amongst a plurality of hosts of a multi-host computing system, the method comprising:
   detecting, by a secured digital host controller (SDHC) virtualization unit, the SD device on occurrence of a reset event;
   receiving an enumeration request at the SDHC virtualization unit, from at least one of a first host and a second host from amongst the plurality of hosts, to enumerate the SD device with respect to the at least one of the first host and the second host;
   enumerating the SD device with respect to at least one of the first host and the second host, wherein the enumerating includes determining a type of SD device;
   activating, by a parsing logic of the SDHC virtualization unit, at least one of a Memory card (MC) parser and an Input/Output command/data (IOC) parser based on the type of the SD device in order to parse commands and requests received at the SDHC virtualization unit; and
   initiating data exchange, between the SD device and the at least one of the first host and the second host by activating of a functionality of the SD device, by at least one of the activated MC parser and the activated IOC parser.

2. The method as claimed in claim 1, wherein the reset event comprises at least one of a powering of at least one host; refresh event of at least one host, and communicative coupling of the SD device with the multi-host computing system.

3. The method as claimed in claim 1, wherein the type of the SD device is determined based in part on SD device characteristics.

4. The method as claimed in claim 1, wherein the method further comprises parsing the commands generated by at least one of the plurality of hosts, by operating the MC parser and the IOC parser in parallel when the type of the SD device is a SD Combo card.

5. The method as claimed in claim 1, wherein the method further comprises arbitrating, by a sharing control unit of the parsing logic, the commands for the SD device by the plurality of hosts, based in part on a pre-defined arbitration technique.

6. The method as claim in claim 5, wherein the arbitrating further comprises:
   determining the SD device to be in a stateless transition point on receiving commands from at least one of the plurality of hosts; and
   processing the commands on determining the SD device to be in a stateless transition point.

7. The method as claim in claim 1, wherein the method further comprises:
   virtualizing a capacity of the SD device into a plurality of partitions; and assigning each of the plurality of partitions dedicatedly to at least one of the plurality of hosts.

8. The method as claim in claim 1, wherein the method further comprises:
receiving an eject request to remove the SD device from a first host of the plurality of hosts;
emulating SD device removal for the first host; and
transmitting a response to the first host based on the emulating.

* * * * *